(12) United States Patent
Ozaki (10) Patent No.: US 7,511,734 B2
(45) Date of Patent: Mar. 31, 2009

(54) MONITORING APPARATUS AND METHOD OF DISPLAYING BIRD'S-EYE VIEW IMAGE

(75) Inventor: Nobuyuki Ozaki, Nishitokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 990 days.

(21) Appl. No.: 11/057,628

(22) Filed: Feb. 15, 2005

(65) Prior Publication Data

US 2006/0029255 A1 Feb. 9, 2006

(30) Foreign Application Priority Data

Aug. 5, 2004 (JP) ............................. 2004-229945

(51) Int. Cl.
*H04N 7/18* (2006.01)
(52) U.S. Cl. ...................... 348/148; 348/143
(58) Field of Classification Search ................. 348/143, 348/148, 149
See application file for complete search history.

(56) References Cited

U.S. PATENT DOCUMENTS

| 6,320,584 | B1 | 11/2001 | Golin et al. |
| 6,466,260 | B1 * | 10/2002 | Hatae et al. ................. 348/149 |
| 2004/0105579 | A1 | 6/2004 | Ishii et al. |

FOREIGN PATENT DOCUMENTS

| EP | 1 223 750 A2 | 7/2002 |
| EP | 1 303 140 A1 | 4/2003 |
| JP | 9-118178 | 5/1997 |
| JP | 3300334 | 4/2002 |
| JP | 2003-196645 | 7/2003 |
| JP | 2004-158855 | 6/2004 |

OTHER PUBLICATIONS

A.W. Leong, "Optical Navigation Sensor Integrated with Lens", Patent Abstracts of Japan of JP Publication No. 2004-158855, (Jun. 3, 2004).
European Search Report issued by European Patent Office on Aug. 5, 2005, in European Patent Application No. 05250848.8.

* cited by examiner

*Primary Examiner*—Allen Wong
(74) *Attorney, Agent, or Firm*—Finnegan, Henderson, Farabow, Garrett & Dunner, L.L.P.

(57) ABSTRACT

A monitoring apparatus for providing the driver with the image of blind-spot areas of a moving body. The monitoring apparatus includes: at least one of fish-eye camera mounted on a moving body, to image fish-eye image around the moving body; a dewarping unit configured to convert at least part of the fish-eye image obtained by the fish-eye camera into a two-dimensional image using a dewarping parameter; a conversion parameter calculation unit configured to calculate a conversion parameter for obtaining a bird's-eye view image from the two-dimensional image, showing an image from a hypothetical position looking down on the moving body; a bird's-eye view image creation unit configured to create a bird's-eye view image by sequentially fetching position data corresponding to each pixel of the bird's-eye view image using the conversion parameter and the dewarping conversion parameter; and a display device to display the bird's-eye view image created by the image creation unit.

12 Claims, 8 Drawing Sheets

MONITORING APPARATUS AND METHOD OF DISPLAYING BIRD'S-EYE VIEW IMAGE

CROSS REFERENCE TO RELATED APPLICATIONS

The application is based upon and claims the benefit of priority from the prior Japanese Patent Application No.2004-229945, filed on Aug. 5, 2004, the entire contents of which is incorporated herein by reference.

BACKGROUND OF THE INVENTION

1. Field of the Invention

The present invention relates to a monitoring technique around a moving body such as a vehicle, etc., around which fish-eye cameras mounted on the moving body monitor. More particularly, the present invention relates to a monitoring apparatus around a moving body and a method of displaying a bird's-eye view image, for obtaining a bird's-eye view image based on the images picked up by fish-eye cameras in order to ensure safe driving for the driver.

2. Description of the Related Art

Up to now, a monitoring apparatus used for a moving body has been using an image processing technique for generating a composite image based on the images picked up by a plurality of cameras in order to support safe driving at the time of driving the moving body.

Figure 13:
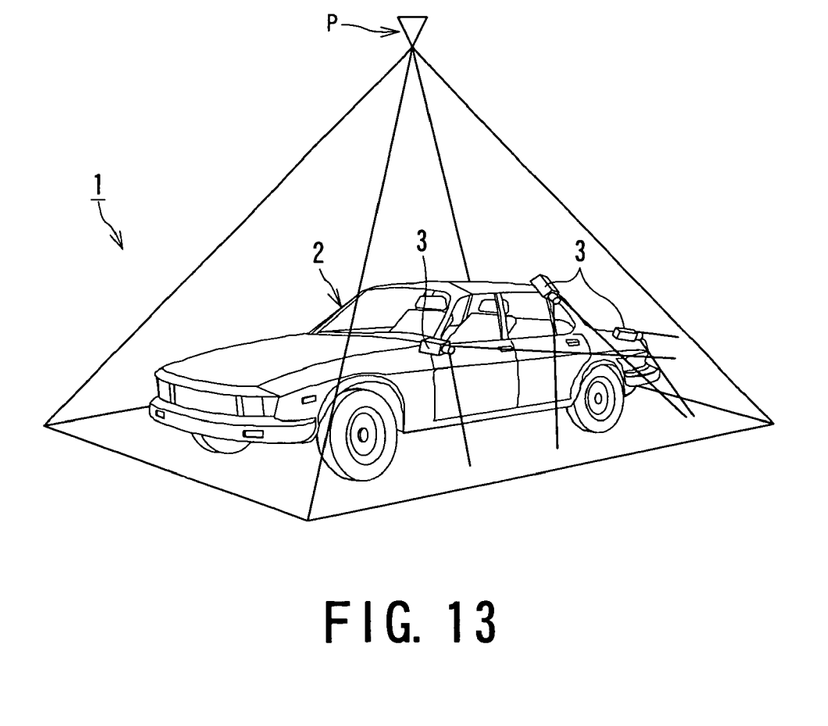
FIG. 13 is a schematic diagram illustrating a relationship between a hypothetical view point and actual cameras in a moving body on which a known monitoring apparatus is mounted.

For example, according to Japanese Patent No. 3300334, as shown in FIG. 13, in a monitoring apparatus 1, a plurality of cameras 3 are attached to arbitrary positions of a moving body 2. The monitoring apparatus 1 generates a composite image based on the images obtained by the plurality of cameras 3 attached to the arbitrary positions to display the composite image in the vehicle 2, thereby making it possible to contribute to safe driving of the vehicle 2. The composite image is produced by image processing such that a hypothetical view point P is set above the vehicle 2 in advance and the vehicle 2 is looked down upon from this hypothetical view point P.

In Japanese Patent No. 3300334, for generating a bird's-eye view image, a mapping table in which corresponding relationships between the pixels of the composite image and the pixel data of each camera image are described is used.

Since the image captured from the hypothetical view point P is a wide-angle image including part of the periphery of the vehicle 2, it is possible for the driver of the vehicle 2 to safely drive while viewing the wide-angle image.

On the other hand, according to the monitoring apparatus 1, since an ordinary camera having a standard lens is used for each camera 3, the image areas covered by these cameras are relatively small. In order to cover the areas necessary for the driving of the moving body, a large number of cameras must be installed. In this case, it is necessary to perform the composite processing of many images, and thus the image processing becomes complicated and it becomes necessary to take much processing time.

Further, the mapping table must be created in advance, and thus it is necessary to take much work and time for creating that table.

Furthermore, another monitoring apparatus around a vehicle has been disclosed in Japanese Unexamined Patent Application Publication No. 2003-196645.

Figure 14:
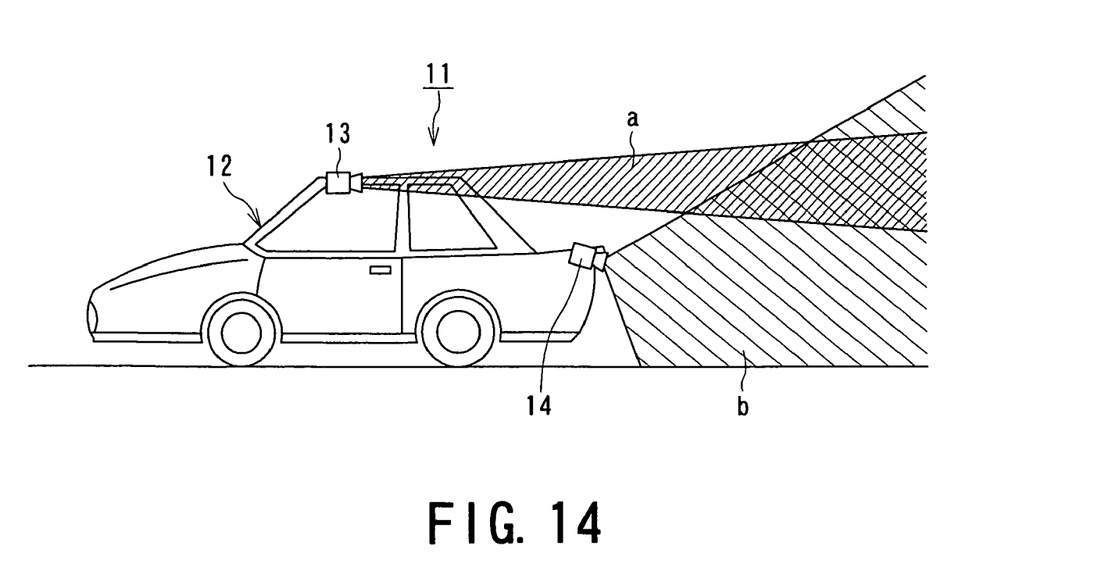
FIG. 14 is a side view of a moving body on which a known monitoring apparatus is mounted.

According to the Japanese Unexamined Patent Application Publication No. 2003-196645, as shown in FIG. 14, in a monitoring apparatus 11, a blind-spot camera 13 is installed at the blind-spot position of the driver in a vehicle 12. In addition, a camera using a fish-eye lens (hereinafter, referred to as fish-eye camera) 14 is installed in a backward direction at the central position of the rear trunk of the vehicle 12. The fish-eye image of the backward area of the moving body obtained from the fish-eye camera 14 is dewarping processed into a usual two-dimensional image to provide the driver with a usual image of the blind spot of the backward area of the moving body.

According to the monitoring apparatus 11, when the vehicle 12 moves forward or backward, an obstacle which exists in front of or at the back of the vehicle, or a body such as another vehicle, etc., which comes into the backward area becomes visible in a visible area, and thus making it possible to contribute to safer driving.

SUMMARY OF THE INVENTION

The present invention has been made in view of the circumstances described above. It is an object of the present invention to provide a monitoring apparatus and a method of displaying bird's-eye view images, which picks up images around a vehicle, etc., with a few fish-eye cameras to obtain a wide-angle image, and which can convert the fish-eye images into bird's-eye view images at a high speed.

In order to achieve the above-described objects, according to one aspect of the present invention, there is provided a monitoring apparatus including: at least one of fish-eye camera mounted on a moving body, to image a fish-eye image around the moving body; a dewarping unit configured to convert at least part of the fish-eye image obtained by the fish-eye camera into a two-dimensional image using a dewarping parameter; a conversion parameter calculation unit configured to calculate a conversion parameter for obtaining a bird's-eye view image from the two-dimensional image, showing an image from a hypothetical position looking down on the moving body; a bird's-eye view image creation unit configured to create a bird's-eye view image by sequentially fetching position data corresponding to each pixel of the bird's-eye view image using the conversion parameter and the dewarping conversion parameter; and a display device to display the bird's-eye view image created by the image creation unit.

In order to achieve the above-described objects, according to another aspect of the present invention, there is provided a surveillance apparatus, including: a plurality of fish-eye cameras mounted on a vehicle imaging fish-eye images around the vehicle; a dewarping unit configured to dewarp at least parts of the fish-eye images into two-dimensional images using dewarping parameters; a conversion parameter calculation unit configured to calculate conversion parameters for converting the two-dimensional images into bird's-eye view images, each viewing from a hypothetical position looking down on the vehicle; a bird's-eye view image generating unit configured to generate bird's-eye view images by sequentially calculating position data of a pixel in the fish-eye image corresponding to each pixel of the bird's-eye view image using the conversion parameter obtained by the conversion parameter calculation unit and the dewarping parameter; an image superposing unit configured to superpose the bird's-eye view images into an superposed image; and a display device to display the superposed image generated by the image superposing unit.

In order to achieve the above-described objects, according to still another aspect of the present invention, there is provided a method of displaying a bird's-eye view image, including steps of: storing a fish-eye image into a first memory showing surroundings of a movable body obtained using a fish-eye camera attached to the movable body; performing calibration processing on part of the fish-eye image in advance and obtaining a group of image-conversion parameters to be used for converting the fish-eye image into a bird's-eye view image for overlooking the movable body to store the parameters into a second memory; and sequentially calculating an image-data position of the fish-eye image corresponding to each pixel data of the bird's-eye view image using the group of image-conversion parameters of the second memory and sequentially fetching the image data from the first memory as pixel data of the bird's-eye view image to supply to a display device.

In order to achieve the above-described objects, according to a further aspect of the present invention, there is provided a method of converting an image for converting a fish-eye image obtained by a fish-eye camera mounted on a moving body into a bird's-eye view image viewed from a hypothetically overlooking position of the moving body, including: obtaining a dewarping parameter for converting the fish-eye image into a dewarped image and a conversion parameter for converting the dewarped image into the bird's-eye view, thereby storing parameters into a parameter file; and calculating a pixel position in the fish-eye image corresponding to each pixel in the bird's-eye view image using the dewarping parameter and the converting view parameter stored in the parameter file and sequentially fetching the pixel data as pixel data in the bird's-eye view image.

According to the present invention, it is possible to create a bird's-eye view by setting a hypothetical view point above a vehicle, etc., based on the images picked up including blind-spot areas around a vehicle, etc., using fish-eye cameras installed at predetermined positions of a moving body such as a vehicle, etc.

Accordingly, it has become possible to see the bird's-eye view images around the vehicle at the driver's side, and thus the driver can easily check the location of an obstacle, etc., around the vehicle. It is therefore possible to provide a monitoring apparatus and a method of displaying bird's-eye view images which can contribute to safe driving by preventing the vehicle from hitting or bumping a body such as this obstacle, etc.

DESCRIPTION OF THE PREFERRED EMBODIMENTS

A description will be given of a monitoring apparatus around a moving body according to embodiments of the present invention with reference to the accompanying drawings.

Figure 1:
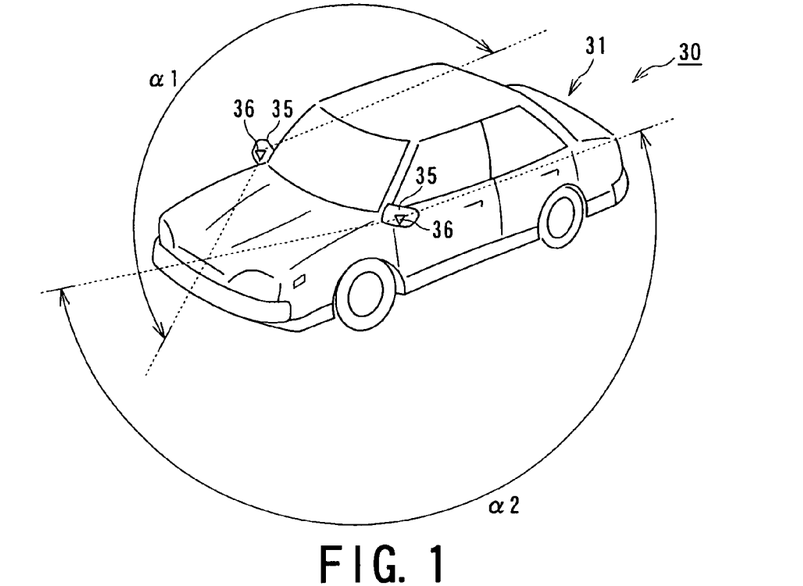
FIG. 1 is a perspective view of a vehicle on which a monitoring apparatus according to present invention is mounted.
Figure 2:
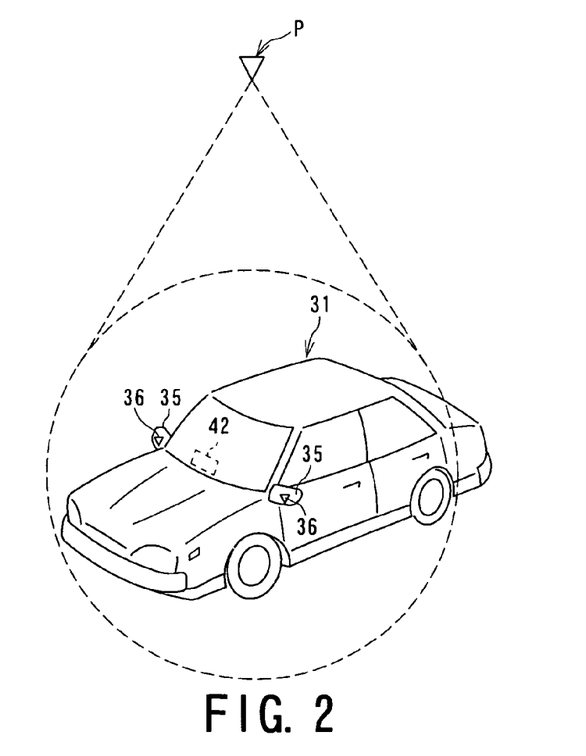
FIG. 2 is a diagram illustrating a hypothetical view point of a vehicle on which a monitoring apparatus according to present invention is mounted.
Figure 3:
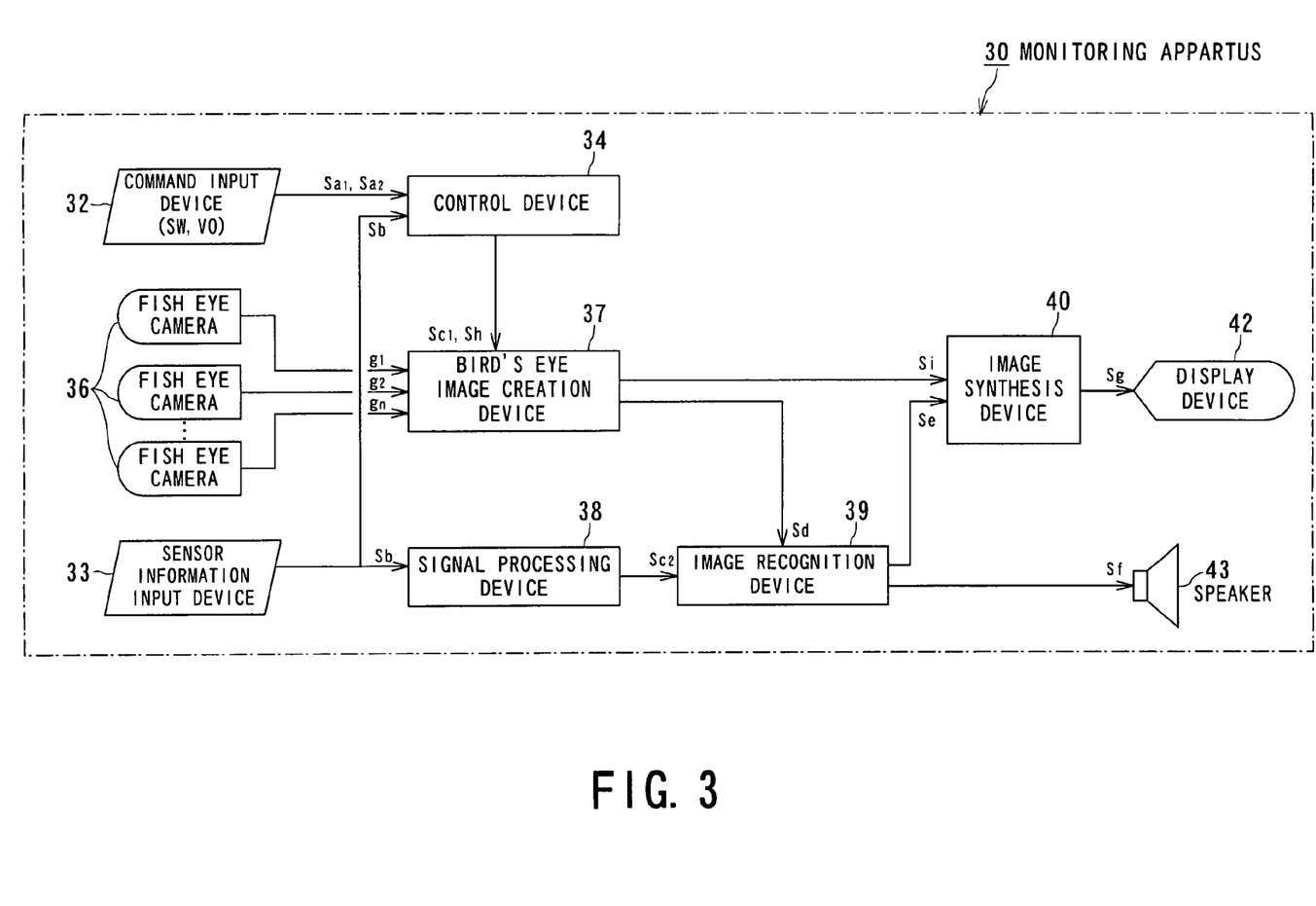
FIG. 3 is a functional block diagram illustrating a monitoring apparatus according to present invention.

FIGS. 1 to 3 are schematic diagrams illustrating a monitoring apparatus 30 according to embodiments of the present invention.

The monitoring apparatus 30 is used for monitoring around moving body such as a vehicle 31 or the like. As shown in FIG. 1, in the monitoring apparatus 30, respective fish-eye cameras 36 having a function stored an image data (hereinafter, referred to as image data storing function), are mounted on both side-view mirrors 35 of the vehicle 31 such as a private car, etc., and thus a wide-angle image obtained by fish-eye cameras 36 (hereinafter, referred to as fish-eye image) having effective fields of view $\alpha 1$ and $\alpha 2$ including fields of view that are blind spots from a driver during the driving of the vehicle 31 and upon starting to drive. Although omitted in the figure, it is possible to cover all the surroundings of the vehicle 31 using fish-eye cameras by further providing fish-eye cameras 36, for example, in front of and at the back of the vehicle 31.

As shown in FIG. 2, a concept of the monitoring apparatus 30 is obtaining a bird's-eye view image by setting a hypothetical view point P above the vehicle 31, using fish-eye images obtained by the fish-eye cameras 36, and looking down upon the vehicle 31 and its surroundings from this hypothetical view point P. The monitoring apparatus 30 includes a bird's-eye view image creation device 37 described below so as to generate the bird's-eye view image viewed from a hypothetical view point P on the basis of fish-eye images obtained by a plurality of (n) fish-eye cameras 36 installed on the vehicle 31. The obtained bird's-eye view is displayed, for example, on a display device 42 such as a navigation display device provided for a car-navigation device and an arbitrary display device through an image-synthesis device 40 described below. Note that the method of creating the bird's-eye view image will be described later.

Figure 4:
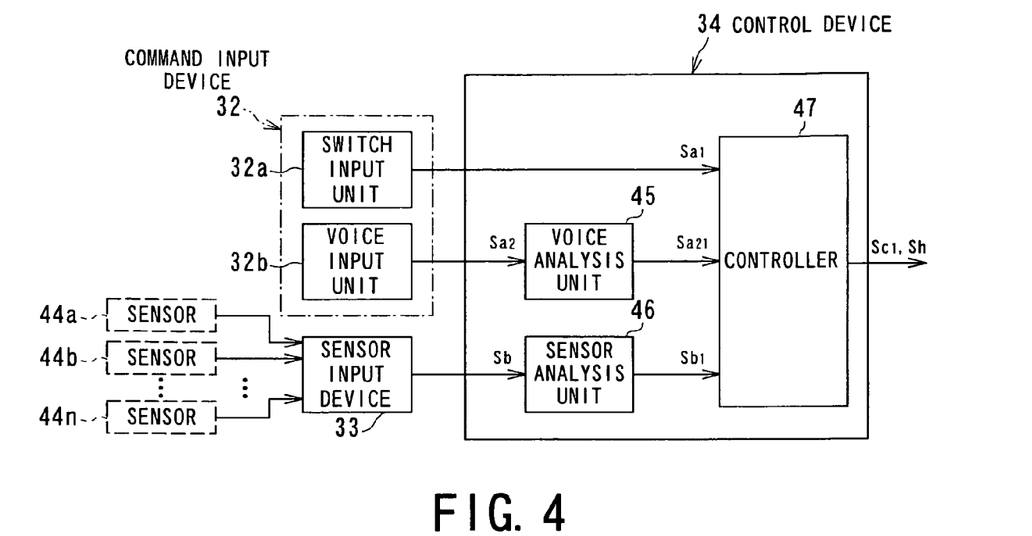
FIG. 4 is a block diagram illustrating a function of the monitoring apparatus according to present invention.

As shown in FIG. 3, the monitoring apparatus 30 also includes a command-input device 32 for allowing the driver to operate and a sensor-information input device 33 for receiving sensor information of various sensors 44a, 44b . . . , and 44n (which are shown in FIG. 4) provided on the periphery of the vehicle 31.

Upon inputting an operation by user, the command-input device 32 generates input signals (Sa1 and Sa2) and provides the input signals to control device 34. The sensor-information input device 33 receives detection signals as sensor information of a solid body which is existent in the vicinity of the outside of the vehicle and of various vehicle information such as the states of the vehicle 31 (a gear position, a steering angle, a vehicle speed or the like), from sensors 44a, 44b ..., and 44n. For example, the detection signals of the solid body are obtained from an active sensing device such as a radar used an extremely-high frequency wave (EHF) or the like, which is an example of sensors 44a, 44b ..., and 44n. The sensor-information input device 33 provides the detection signals as a sensor-input signal Sb to control device 34 and signal-processing device 38.

The signal-processing device 38 receives the sensor-input signal Sb. If there is, for example, a solid body around the vehicle acting as an obstacle hindering the travelling of the vehicle, the signal-processing device 38 generates an obstacle-identifying data signal Sc2 to supply it to an image-recognition device 39.

The image-recognition device 39 recognizes a caution-needed area during driving by an image-recognition method using image-data signals Sd (Sd1 to Sdn) obtained from bird's-eye view image creation device 37. In this case, more preferably, the image-recognition device 39 may also use the obstacle-identifying data signal Sc2. Upon having recognized the caution-needed area, the image-recognition device 39 generates a caution-needed area data signal Se and a voice-guidance signal Sf in order to arouse caution, and outputs the caution-needed area data signal Se and the voice-guidance signal Sf.

The voice-guidance signal Sf is converted into voice by a speaker 43 installed, for example, at the driver's seat of the vehicle 31 to transmit a voice-guidance from the speaker 43.

The caution-needed area data signal Se from the image-recognition device 39 is input into the image-synthesis device 40. At the same time, the image-synthesis device 40 receives the caution-needed area data signal Se and a bird's-eye view synthesis image data signal Si output from the bird's-eye view image creation device 37. Then, the image-synthesis device 40 generates a synthesis-image data signal Sg which is a signal for displaying the synthesis-image synthesized so as to inform the caution-needed area in the bird's-eye view image, and outputs the synthesis-image data signal Sg to the display device 42. When the display device 42 receives the synthesis-image data signal Sg, the synthesis-image on the basis of the synthesis-image data signal Sg is displayed on the display device 42 Thus, the synthesis-image is presented to the driver.

On the other hand, as shown in FIG. 4, the command-input device 32 has a switch-input unit 32a and a voice-input unit 32b.

The switch-input unit 32a can output a switch-input signal Sa1 to the control device 34 by appropriately turning on switches in the event that, for example, the driver of the vehicle 31 instructs to display the state of an arbitrary area.

Further, the voice-input unit 32b can output a voice-input signal Sa2 to the control device 34 by the vehicle 31 driver's instruction to switch to appropriate screen display, etc., by voice. The control device 34 has a voice-analysis unit 45. The voice-analysis unit 45 analyzes the content of a voice instruction of the voice-input signal Sa2 and can output a voice-analysis signal Sa21 to the controller 47.

In FIG. 4, the sensors 44a, 44b ..., and 44n detect a gear-lever position of the vehicle 31, a steering-wheel rotation angle (steering angle), a vehicle speed, or the like as detection signals and output the detection signals to the sensor-information input device 33. The detection signals received from the sensor-information input device 33 are input to a sensor-analysis unit 46 as the sensor-input signal Sb. The sensor-analysis unit 46 analyzes the sensor-input signal Sb and generates a sensor-analysis signal Sb1 on the basis of an analysis result. Then, the sensor-analysis signal Sb1 is output from the sensor-analysis unit 46 to the controller 47.

As shown in FIG. 4, the controller 47 included in the control device 34 receives the switch-input signal Sa1 output from the command-input device 32, the voice-input signal Sa21 output from the voice-analysis unit 45, and output from the sensor-analysis signal Sb1 sensor-analysis unit 46. Then, the controller 47 supplies, for example, a region-of-interest presentation signal Sc1 indicating the display of the interested region (ROI: Region of Interest) and a bird's-eye view image creation instruction signal Sh to the bird's-eye view image creation device 37.

A detailed description will be given of the bird's-eye view image creation device 37 shown in FIG. 3 with reference to FIG. 5.

Figure 5:
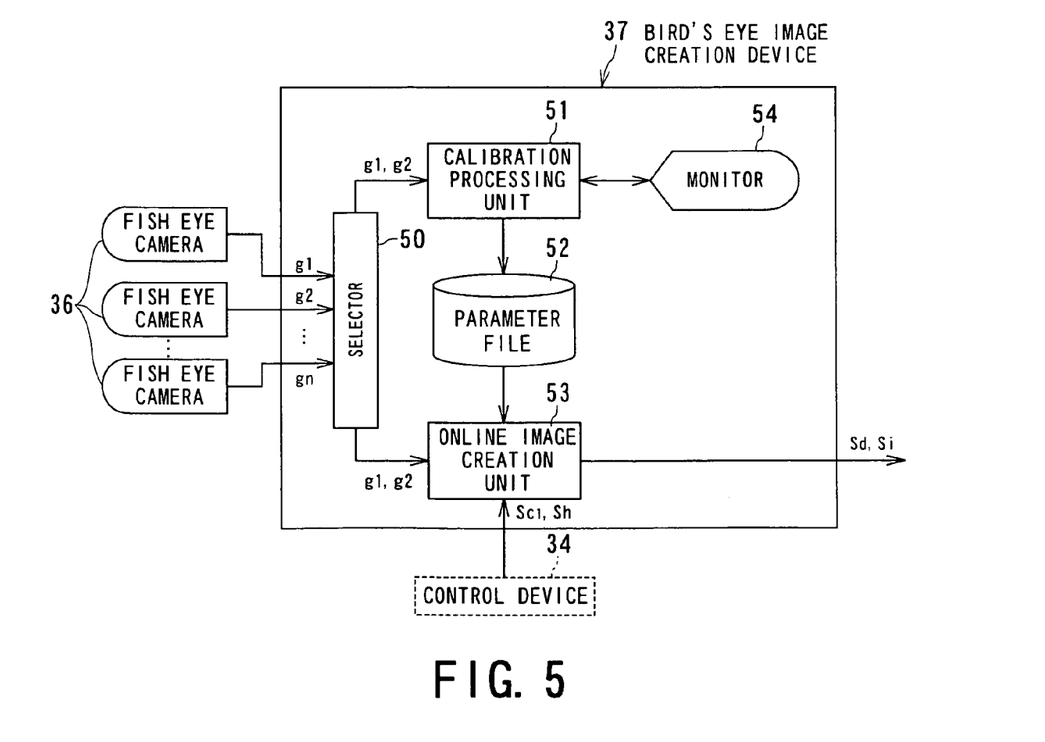
FIG. 5 is a functional block diagram of bird's-eye view image creation device in the monitoring apparatus according to present invention.

The bird's-eye view image creation device 37 shown in FIG. 5 is configured to create the bird's-eye view image in accordance with the bird's-eye view image creation instruction signal Sh at online bird's-eye view image creation time. In addition, The bird's-eye view image creation device 37 is configured to display and enlarge a region-of-interest among bird's-eye view images created in accordance with the region-of-interest presentation signal Sc1. The bird's-eye view image creation device 37 creates the bird's-eye view images, thereby generating and outputting the bird's-eye view synthesis image data signal Si and the image-data signal Sd.

As shown in FIG.5, the bird's-eye view image creation device 37 includes a selector 50 for selecting the transmission of the camera-image data signals g1 to gn, a calibration processing unit 51 for performing a calibration processing generating a conversion parameters in order to generate the bird's-eye view image, a parameter file 52 for storing the generated conversion parameters, an online-image creation unit 53 for generating a bird's-eye view image using the camera-image data signals g1 to gn and the parameters in the parameter file 52, and a monitor 54 for displaying a progress and result of the calibration processing. Note that the monitor 54 may be a line-out (output terminal) so as to display another monitor.

The bird's-eye view image creation device 37 performs a first procedure for performing calibration processing in a calibration processing unit 51 (calibration processing procedure) and a second procedure for creating a bird's-eye view image in the online-image creation unit 53 at driving time of the vehicle 31 (online-image creation processing procedure).

In the bird's-eye view image creation device 37, camera-image data signals g1, g2, ..., gn obtained from a plurality of fish-eye cameras 36 received by the selector 50. The camera-image data signals g1 to gn are transmitted to the calibration processing unit 51 at the time of the first procedure, and are transmitted to the online-image creation unit 53 at the time of the second procedure. Further, the region-of-interest presentation signal Sc1 and the bird's-eye view image creation instruction signal Sh from the control device 34 are received by the online-image creation unit 53.

When the calibration processing unit 51 receives the camera-image data signals g1 to gn in advance of driving the vehicle 31, the calibration processing unit 51 starts the calibration processing as the first procedure. In the calibration processing, user can check and verify a progress and result of the calibration processing with reference to the monitor 54. Note that a detailed description of the first procedure will be given hereinafter.

Figure 6:
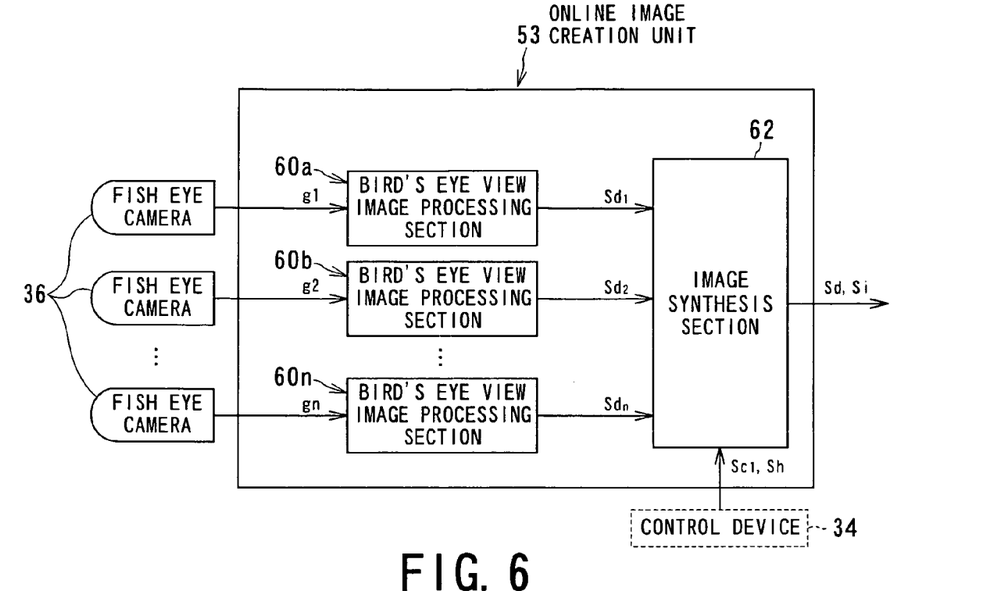
FIG. 6 is a functional block diagram of an online-image creation unit in the monitoring apparatus according to present invention.

In the online-image creation processing procedure (the second procedure), the fish-eye images obtained online from bird's-eye view image sections 60a, 60b, ..., and 60n shown in FIG. 6 are finally converted into a bird's-eye view image viewed from a hypothetical view point P shown in FIG. 2 using image-synthesis section 62 serving as image-synthesis unit. Conceptually, first, dewarping processing for normalizing the fish-eye images to a normal two-dimensional image is performed by Expression 1.

$Px = -U' \cdot ku \cdot \sin \phi - V' \cdot kv \cdot \cos \phi \cos \theta + \sin \theta \cos \phi$ $Py = U' \cdot ku \cdot \cos \phi - V' \cdot kv \cdot \sin \phi \cos \theta + \sin \theta \sin \phi$ $Pz = V' \cdot kv \cdot \sin \theta + \cos \theta$ $\theta s = \tan^{-1}(sqrt(Px^2 + Py^2)/Pz)$ $\phi s = \tan^{-1}(Py/Px)$ $l = 2 * r\_pxl * \theta s / \pi$ $X\_pixel = l * \cos(\phi s)$ $Y\_pixel = l * \sin(\phi s)$ [Expression 1]

Next, the dewarped image is converted into a bird's-eye view image by Expression 2.

$$\begin{pmatrix} ui^D \\ vi^D \\ wi \end{pmatrix} = \begin{pmatrix} h11 & h12 & h13 \\ h21 & h22 & h23 \\ h31 & h32 & h33 \end{pmatrix} \begin{pmatrix} u \\ v \\ 1 \end{pmatrix}$$ [Expression 2]

$$U' = ui^D / wi$$

$$V' = vi^D / wi$$

In the second procedure, dewarping parameters for dewarping processing the fish-eye images and bird's-eye view image parameters for converting a dewarped image into a bird's-eye view image are used, respectively. To describe the relationships among each of the images using FIG. 7, if the relationship between a fish-eye image area Gx and the dewarped image area Gy, i.e., the parameters of Expression 1 is known, it is possible to convert an fish-eye image into a dewarped image. Specifically, the dewarping parameters are accordance with image pickup characteristics of the fish-eye cameras 36 can be used.

Figure 7:
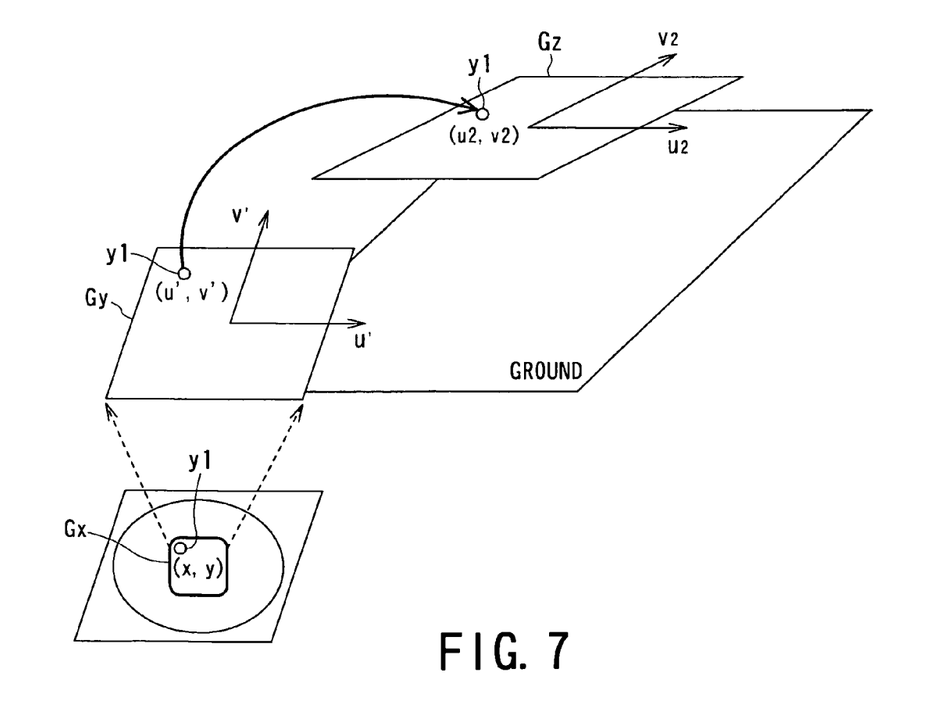
FIG. 7 is a diagram for illustrating of relationships between image areas.

In addition, if the relationship between the dewarped image area Gy and a bird's-eye view image area Gz, i.e., the parameters of Expression 2 is known, it is possible to convert a dewarped image into a bird's-eye view image. More particularly, bird's-eye view image parameters are accordance with attachment positions and postures of the fish-eye cameras 36 can be used.

Since the plurality of bird's-eye view images corresponding to the plurality of fish-eye cameras 36 are obtained, these images are integrated into one image to be presented as an integrated bird's-eye view image including the vehicle and the surroundings thereof, thereby appropriately presenting the states around the vehicle. In this regard, for the dewarping processing used herein, a method described in detail, for example, in Japanese Patent Application No. 2004-158855 specification by the present inventor can be used. Further, in order to achieve high-speed processing, It is possible to omit the step for actually creating dewarped images themselves.

In the following, first, a detailed description will be given of a specific example of the calibration processing procedure (the first procedure) of the fish-eye images from the fish-eye cameras 36 with reference to FIG. 9. Next, a detailed description will be given of the online image-creation processing procedure (the second procedure) with reference to FIG. 6.

In the calibration processing procedure (the first procedure), in advance of performing the online image-creation processing procedure (the second procedure) by the bird's-eye view image creation device 37 (specifically, the online-image creation unit 53), the dewarping parameters and the bird's-eye view image parameters for using in the online image-creation processing procedure are obtained. The dewarping parameters and the bird's-eye view image parameters obtained in the calibration processing are stored in the parameter file 52.

Figure 9:
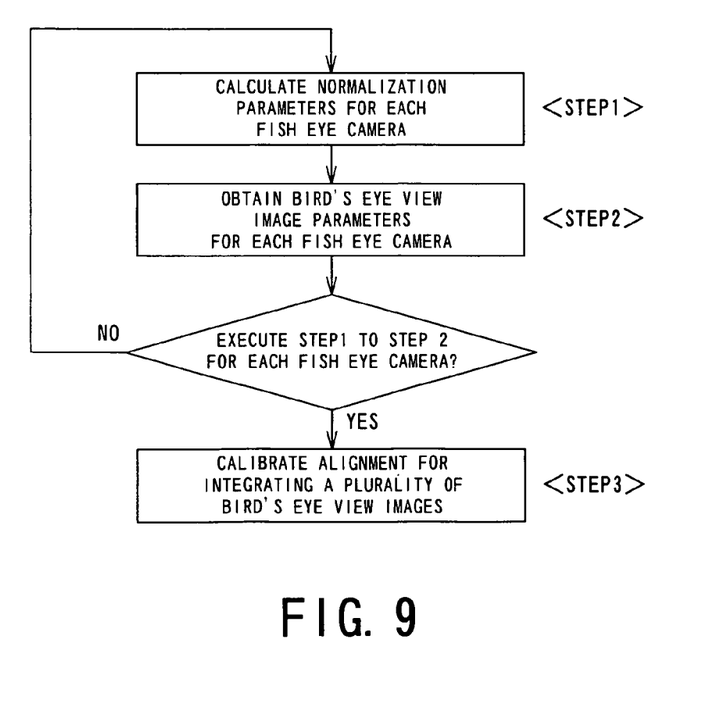
FIG. 9 is a flowchart illustrating calibration processing for obtaining a bird's-eye view image from fish-eye images.

As shown in FIG. 9, in detail, the calibration processing procedure includes three steps (step 1 to step 3).

In the step 1, the dewarping parameters related to Expression 1 are obtained for each fish-eye camera 36. In the step 2, the bird's-eye view image parameters (H matrix) related to Expression 2 are obtained for each fish-eye camera 36. In the step 3, alignment information for performing alignment calibration is obtained in order to integrate a plurality of bird's-eye view images.

First, in the step 1, the dewarping parameters necessary for converting fish-eye images obtained from fish-eye cameras 36 into normal two-dimensional images are calculated. That is to say, image-pickup system parameters are calculated on the basis of the CMOS (or CCD) characteristics and lens characteristics of individual fish-eye cameras 36. The image-pickup system parameters include information responding to the size of image, the central position of the fish-eye image and the radius of the fish-eye image, at least. The parameters are directly related to Expression 1, and are used for coordinate conversions.

In Expression 1, the polar coordinates of one pixel in the fish-eye image area Gx is assumed to be ($\theta s$, $\phi s$), and the XY coordinates thereof are represented by (X_pixel, Y_pixel). Further, One pixel in the dewarped image area Gy is represented by (Px, Py, Pz).

The parameters ku and kv are determined by the size of an image and the zoom magnification of a camera. Further, r_pxl is a radius of a fish-eye image.

That is to say, the dewarping parameters can be calculated using known information of fish-eye cameras 36 such as the CMOS (or CCD) characteristics, lens characteristics, or the like, in advance.

In the step 2, an H matrix related to Expression 2 is calculated. The step 2 has two sub-steps in order to calculate the H matrix. The reason why the step 2 includes two sub-steps resides in that the bird's-eye view image parameters, which are coefficients, etc., of the H matrix, cannot be calculated only by known information such as the attachment positions of the fish-eye cameras 36.

Figure 10:
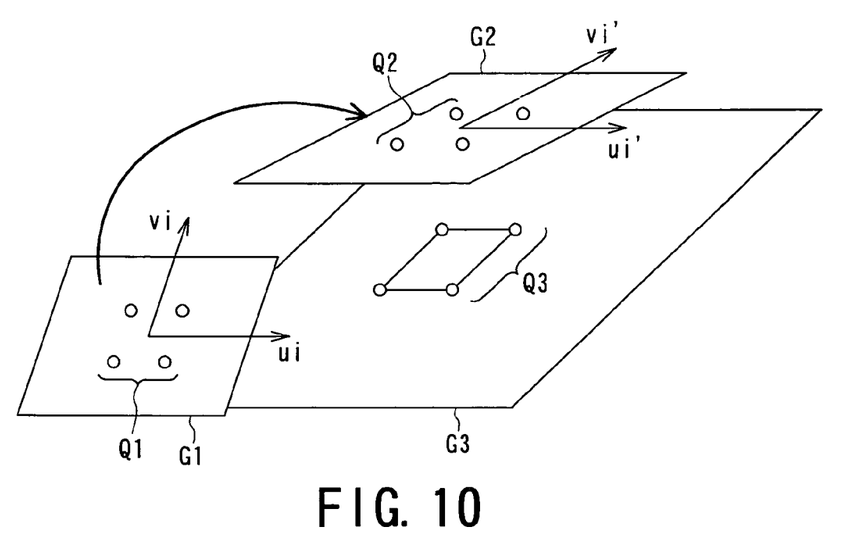
FIG. 10 is a diagram illustrating the concept of the calibration processing for bird's-eye view imaging in FIG. 7.

In the first sub-step, as shown in FIG. 10, the fish-eye cameras 36 takes images of a marker Q3 placed on the ground G3, shaped of known four points or more. Then, the shape connecting the corner points of the picked-up image to be viewed from above is drawn and displayed on the monitor 54. Then, the corresponding relationships with the corner points are made by Graphical User Interface (hereinafter, referred to as GUI).

In FIG. 10, suppose that a marker Q1 on a dewarped image plane G1 is a dewarped image produced by the dewarping of the fish-eye image obtained by taking the images of the marker Q3 by the fish-eye camera. The bird's-eye view image obtained when the dewarped image including the marker Q1 is converted into a bird's-eye view image corresponds to a marker Q2 on a bird's-eye view image plane G2. That is to say, here, the corresponding relationship is established between a pixel (Ui, Vi) in the bird's-eye view image and a pixel (Ui', Vi') in the dewarped image. Accordingly, Expression 3 holds for each suffix i. Here, H having nine elements and αi are unknown.

$$\alpha i \begin{pmatrix} Ui' \\ Vi' \\ 1 \end{pmatrix} = H \begin{pmatrix} Ui \\ Vi \\ 1 \end{pmatrix} \quad \text{[Expression 3]}$$

In the next second sub-step, assuming that h11=1, an unknown quantity is X, formulation can be made as a least-squares problem as shown by Expression 4 and Expression 5.

$$b' - A \cdot X = 0 \quad \text{[Expression 4]}$$

[Expression 5]

$$b' = (u_1'\ 0\ 0\ u_2'\ 0\ 0\ u_3'\ 0\ 0\ u_4'\ 0\ 0)^t$$

$$X = (h_{12}\ h_{13}\ h_{21}\ h_{22}\ h_{23}\ h_{31}\ h_{32}\ h_{33}\ \alpha_1\ \alpha_2\ \alpha_3\ \alpha_4)^t$$

$$A = \begin{pmatrix} v_1' & 1 & 0 & 0 & 0 & 0 & 0 & 0 & -u_1 & 0 & 0 & 0 \\ 0 & 0 & u_1' & v_1' & 1 & 0 & 0 & 0 & -v_1 & 0 & 0 & 0 \\ 0 & 0 & 0 & 0 & 0 & u_1' & v_1' & 1 & -1 & 0 & 0 & 0 \\ v_2' & 1 & 0 & 0 & 0 & 0 & 0 & 0 & 0 & -u_2 & 0 & 0 \\ 0 & 0 & u_2' & v_2' & 1 & 0 & 0 & 0 & 0 & -v_2 & 0 & 0 \\ 0 & 0 & 0 & 0 & 0 & u_2' & v_2' & 1 & 0 & -1 & 0 & 0 \\ v_3' & 1 & 0 & 0 & 0 & 0 & 0 & 0 & 0 & 0 & -u_3 & 0 \\ 0 & 0 & u_3' & v_3' & 1 & 0 & 0 & 0 & 0 & 0 & -v_3 & 0 \\ 0 & 0 & 0 & 0 & 0 & u_3' & v_3' & 1 & 0 & 0 & -1 & 0 \\ v_4' & 1 & 0 & 0 & 0 & 0 & 0 & 0 & 0 & 0 & 0 & -u_4 \\ 0 & 0 & u_4' & v_4' & 1 & 0 & 0 & 0 & 0 & 0 & 0 & -v_4 \\ 0 & 0 & 0 & 0 & 0 & u_4' & v_4' & 1 & 0 & 0 & 0 & -1 \end{pmatrix}$$

Accordingly, this problem can be solved using a generalized inverse matrix and singular value decomposition. Thus, each element of H matrix is obtained.

Specifically, as shown in FIG. 7, the calibration processing unit 51 of the bird's-eye view image creation device 37 obtains the image dewarping processed on the basis of the attachment position of the fish-eye camera 36 from the fish-eye image area Gx, which is part of the fish-eye images. In this case, it is desirable to pick up the image of a figure having a known shape by the fish-eye camera 36.

It is necessary only that the dewarping processing be performed on the fish-eye image (portion including a known figure) of the fish-eye image area Gx for a known fish-eye image. The dewarping processed image is displayed on the monitor 54, and a plurality of (four or more) points (pixel positions) of the known figure are specified using GUI. For example, in the event that the points of the known figure are four points on a square on the ground G3, the bird's-eye view of the square should be obtained.

However, even if the image of this square is picked up by the fish-eye camera 36, the fish-eye image thereof and the dewarped image usually do not become a square. However, if the operator is aware that the image is picked up from a square, it is possible to specify pixels corresponding to that square on the monitor screen of the bird's-eye view image creation device 37. At this time, by specifying, for example, four points of the square, the coordinates (Ui, Vi) and (Ui', Vi') in Expression 3 become known, and thus it becomes possible to obtain the H coefficients.

In this regard, the known figure on the ground G3 used in this processing is not limited to a square. As long as a known figure, the corresponding relation between the two figures can be specified.

That is to say, in the second sub-step in the step 2 of the calibration processing procedure, it is possible to easily calculate backward the unknowns in Expression 3.

Figure 11:
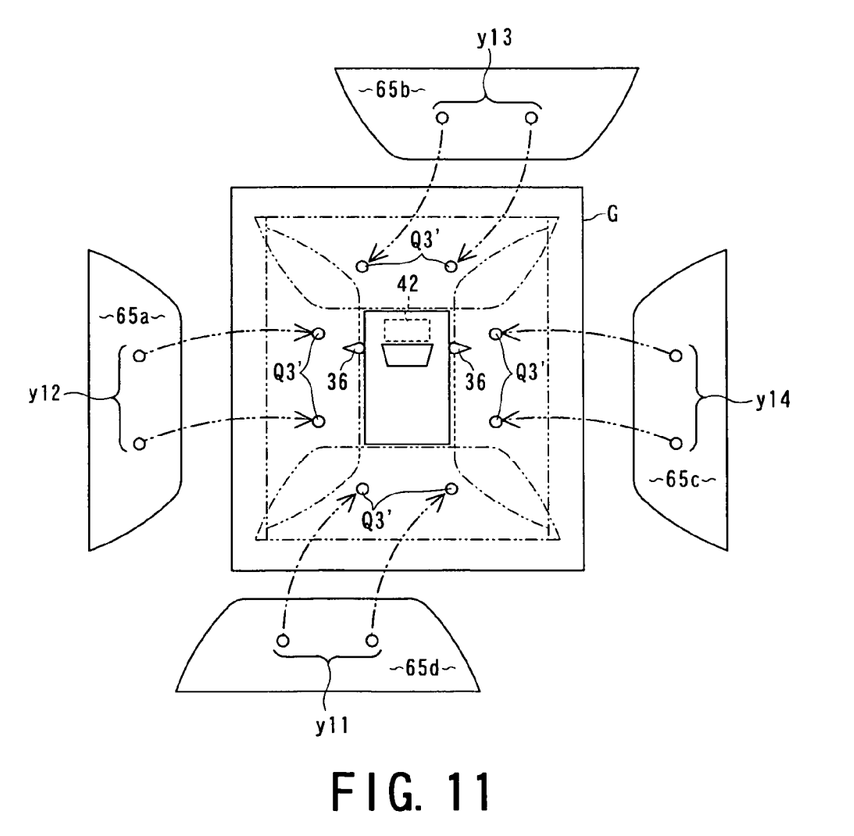
FIG. 11 is a schematic diagram for illustrating the step 3 of the calibration processing shown in FIG. 9.

Next, as shown in FIG. 11, in the step 3 for calibrating the alignment of a bird's-eye view image, alignment information for integrating into one bird's-eye view image is obtained by aligning the positions Q3' on the screen corresponding to markers y11 to y14 imaged in a plurality of image-pickup areas 65a to 65d. More particularly, in the event that the bird's-eye view images obtained from individual image-pickup areas are displayed on the monitor 54, the user specifies the corresponding markers by using GUI. Thus, it is possible to obtain alignment information indicating positional relationships of individual bird's-eye view images.

Referring back to FIG. 5, the dewarping parameters, the bird's-eye view image parameters, and the alignment information obtained by the calibration processing described above are stored in the parameter file 52 and are used for generating an online image.

Next, a detailed description will be given of the online-image creation unit 53 included in the bird's-eye view image creation device 37 and the online image-creation processing procedure with reference to FIG. 6 showing the block configuration thereof.

The online-image creation unit 53 as a dewarping unit, a conversion parameter calculation unit, and a bird's-eye view image creation unit includes: the bird's-eye view image sections 60a to 60n for generating bird's-eye view images based on the camera-image data signals g1, g2, . . . , gn obtained from a plurality of fish-eye cameras 36 using the dewarping conversion parameters and the H matrix conversion parameters; and the image-synthesis section 62 for receiving the image-data signals Sd (Sd1 to Sdn) processed and generated by the bird's-eye view image sections 60a to 60n to generate the bird's-eye view synthesis image data signal Si.

The bird's-eye view image sections 60a to 60n generate the image-data signals Sd corresponding to bird's-eye view images by using the parameters contained in the parameter file 52 shown in FIG. 5 when The bird's-eye view image sections 60a to 60n receives the camera-image data signals g1, g2, . . . , gn obtained from a plurality of fish-eye cameras 36, respectively. Since various parameters are known by the calibration processing procedure, the corresponding positions between the pixels in the bird's-eye view images and the pixels in the dewarped images can be calculated by using Expression 2. Further, by the relation of Expression 1, it is possible to calculate the pixels in the dewarped images and the texel values (the values of original pixels to be texture mapped) in the original fish-eye images.

On the basis of these calculations, the pixel position in the fish-eye image corresponding to an arbitrary pixel in the bird's-eye view image is calculated, and the image data of the pixel position is fetched in sequence, thereby creating a bird's-eye view image. In this case, it is not necessary to actually obtain the dewarped image. Accordingly, the bird's-eye view images are directly created from the fish-eye images.

The image-synthesis section 62 performs synthesis processing to integrate the image data included in the image-data signals Sd1 to Sdn generated by the bird's-eye view image sections 60a to 60n into one image data. The image-synthesis section 62 generates the bird's-eye view synthesis image data signal Si including an image produced, by the image processing, into one bird's-eye view image using the alignment information obtained in advance.

In order to generate the bird's-eye view synthesis image data signal Si, the bird's-eye view image sections 60a to 60n perform the bird's-eye view image processing by using Expression 1 and Expression 2.

Figure 8A:
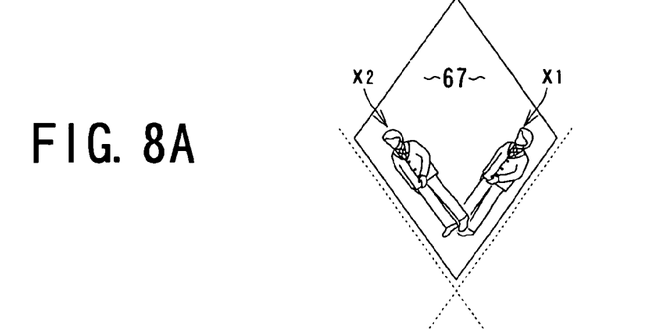
FIG. 8 is a diagram illustrating an example of a bird's-eye view image created in the monitoring apparatus according to present invention.
Figure 8B:
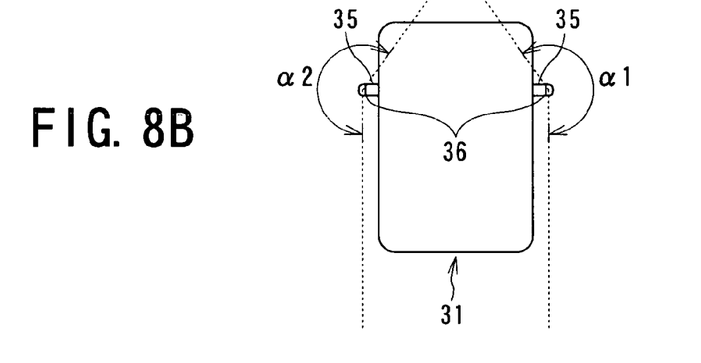

The image-synthesis section 62 has a function of processing the overlapped areas in the process of integrating the image-data signals Sd directly into one image signal as necessary. That is to say, not only one image out of the overlapped area images is drawn, but a plurality of image-data signals Sd drawing the same area are appropriately blended in order to draw one image. Thus, for example, as shown in FIG. 8, one bird's-eye view image in which the feet of the images (persons) x1 and x2 obtained by being imaged from the effective fields of view $\alpha 1$ and $\alpha 2$ of the fish-eye cameras 36, respectively, and each one being installed at each of the side mirrors 35, are joined at one common point in a duplicated image area 67.

In this manner, the images picked up by the fish-eye cameras 36 are integrated, and one bird's-eye view image is displayed on the display device 42 as shown in FIG. 2. Thus, this image is easy for the driver to view. In addition, since the image is highlighted, it is further easier to be viewed.

Referring back to FIG. 6 again, at the time of generating an online image, in the event that there is a bird's-eye view image creation instruction signal Sh, the fish-eye images obtained by the fish-eye cameras 36 are first processed by the bird's-eye view image sections 60a to 60n of the online-image creation unit 53 by selecting and extracting the dewarping parameters corresponding to each fish-eye camera 36, thereby the dewarping images and the bird's-eye view images described above are obtained.

On the other hand, at the time of generating an online image, in the event that the interested-region presentation signal Sc1 is output from the control device 34, the image-synthesis section 62 expands only the portion corresponding to the noticed area of one fish-eye image obtained from the fish-eye camera corresponding to one bird's-eye view image section corresponding to the target fish-eye camera using the fish-eye camera number and the noticed area instruction signal which are separately specified from the command-input device 32 as necessary to be supplied to the display device, thereby making it possible to display a bird's-eye view image of the interested portion (direction).

In the monitoring apparatus 30, in the event that the image-synthesis device 40 receives the caution-needed area data signal Se from the image-recognition device 39 shown in FIG. 3, the image-synthesis device 40 synthesizes the caution-needed area data signal Se as the recognition result of the image-recognition device 39 and the bird's-eye view synthesis image data signal Si as necessary to supply it to the display device 42, for example, the navigation display device.

The image-recognition device 39 recognizes an obstacle based a moving vector of a body in the bird's-eye view image. Specifically, suppose that when the vehicle 31, which is a moving body, moves, for example, a static body on the ground changes in accordance with the movement of this vehicle 31 in the bird's-eye view scene (image).

On the other hand, suppose that a person (obstacle) is walking at the left side of the vehicle 31, a movement in disagreement with the vector in accordance with the movement of vehicle 31 can be detected. It is therefore possible to consider the movement as an obstacle by detecting the change of moving vector.

As described above, the image-recognition device 39 detects a moving body whether or not there is a constant vector in the bird's-eye view image, thereby making it possible to find this moving body not having the constant vector as a moving obstacle. In addition, if it is assumed that the car might bump the obstacle in the event that the vehicle 31 turns left from the place of finding this obstacle, the image-recognition device 39 may issue a warning by a voice guidance or the like.

Second Embodiment of the Online-image Creation Unit

The monitoring apparatus 30 of the present invention may adopt GPU (graphics processor unit) so as to generate an online image. Since GPU has a dewarping image processing function for performing the dewarping image processing, and a bird's-eye view image processing function for performing bird's-eye view image processing (GPU function), GPU is capable of performing the dewarping image processing and the bird's-eye view image processing at a high speed.

According to the monitoring apparatus 30 adopted GPU 82, in the view of the fact that the left-hand side of the first expression in Expression 2 is an expression by homogeneous coordinates, the calculation of the texture in Expression 2 can be executed, for example, by calculating four corner points of the bird's-eye view image to be displayed by Expression 2 in advance, and then by performing texture mapping the inside of the figure in the homogeneous coordinate mode.

Figure 12:
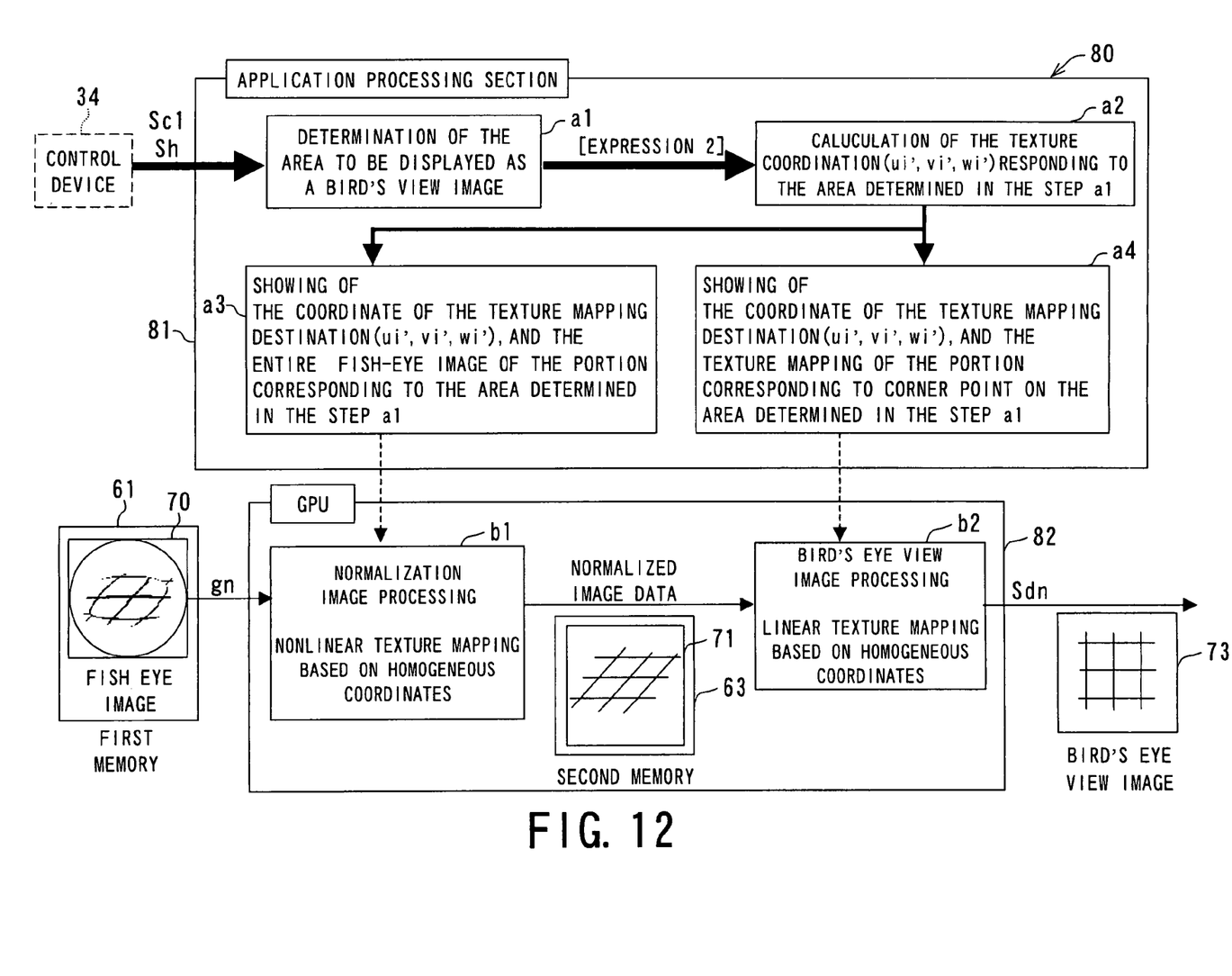
FIG. 12 is a diagram illustrating the concept of the bird's-eye view image processing using GPU.

The monitoring apparatus 30 adopted GPU 82, in the online-image creation unit 53, includes bird's-eye view image sections 80a, 80b, . . . , and 80n in stead of the bird's-eye view image sections 60a, 60b, . . . , and 60n. As shown in FIG. 12, the bird's-eye view image sections 80a, 80b, . . . , and 80n includes an application processing section 81 for performing an application processing (step a1 to step a4), and GPU 82 for performing the dewarping image processing (step b1) and the bird's-eye view image processing (step b2) at high speed. Accordingly, each bird's-eye view image section as shown in FIG. 12 can perform processing at a high speed by the cooperation of application processing section 81 and the GPU 82.

The application processing section 81 is preinstalled an application software for executing the application processing in which the positions of four corners of the drawing area to be displayed as a bird's-eye view image are calculated. The application processing includes the step a1 to the step a4.

In the step a1, the area to be displayed as a bird's-eye view image is determined. For example, this area is assumed to be a rectangle, four corner points (ui, vi) (i=1 to 4) are specified for defining this area by the rectangle. In the step a2, texture coordinates (ui, vi, wi) in the dewarped image corresponding to the four corner points are calculated by using Expression 2. In the step a3, the coordinates (ui', vi', wi') of the texture mapping destination of the portion corresponding to the area determined in the step 1 from the step 2 are clearly indicated, and the entire fish-eye original image is clearly shown as a texture. In the step a4, the coordinates of the texture mapping destination of the rectangular portion and the coordinates (ui', vi', wi') of the texture are clearly shown.

In this regard, in each of the steps a1 to a4, the processing corresponding to Expression 1 used in the dewarping processing is executed by the dewarping processing function of GPU 82, and the processing corresponding to Expression 2 used in the bird's-eye view image processing is executed by the bird's-eye view image processing function of GPU 82.

As shown in FIG. 12, in the step b1, three-dimensional nonlinear texture mapping is performed on the fish-eye image 70 of a fish-eye image memory (first memory) 61 by homogeneous coordinates and the generated dewarped image data is stored in a dewarped image memory (second memory) 63 as a dewarped image 71. In the step b2, three-dimensional linear texture mapping is performed on the dewarped image 71 to generate a bird's-eye view image 73.

Further, in steps b1 and b2 for performing each texture mapping, the plane including a bird's-eye view image as viewed from the bird's-eye view position is considered as a drawing area, and is considered as the target of the texture mapping performed in three dimensions. Thus, considerable processing can be performed on the graphic board.

As described above, at least one of the steps b1 and b2 for performing each texture mapping is performed by high-speed processing (GPU processing), and thus it is possible to perform color processing and moving-image processing at a high speed in particular.

In this regard, in the above description, the first memory 61 and the second memory 63 may be virtual memories. In other words, respective bird's-eye view image sections 80*a*, 80*b*, . . . , and 80*n* can perform whether or not the first memory 61 and the second memory 63 are virtual memories. That is to say, since the dewarped images are not created in the middle, it is possible to directly convert a fish-eye image into a bird's-eye view image online at a high speed.

Note that GPU 82 is not necessarily in respective bird's-eye view image sections 80*a*, 80*b*, . . . , and 80*n*. GPU 82 may be shared in the online-image creation unit 53A. For example, the online-image creation unit 53A may include at least one of bird's-eye view image sections 80*a*, 80*b*, . . . , and 80*n*, and one GPU 82.

As described above, according to the monitoring apparatus 30, the monitoring apparatus 30 can draw moving images at a high speed, and thus it is possible to apply the apparatus to a video monitor mounted on a vehicle, capable of being used in real time.

In addition, by mounting the apparatus on a moving body such as a vehicle, it is possible to provide a very effective monitoring apparatus for safe driving.

In this regard, the vehicle 31 exemplified as a moving body of the monitoring apparatus 30 is not necessarily a moving body. In the event of employing the apparatus in a system in which the surroundings thereof move, a body such as a fixed body simply including fish-eye cameras may be used.

Note that each fish-eye camera 36 of the monitoring apparatus 30 does not always have the image data storing function. The monitoring apparatus 30 may include fish-eye cameras 36 not having the image data storing function and an image capture device having the image data storing function, or a bird's-eye image creation device further having the image data storing function, instead of fish-eye cameras 36 having the image data storing function.

What is claimed is:

1. A monitoring apparatus comprising:
at least one of fish-eye camera mounted on a moving body, to image a fish-eye image around the moving body;
a dewarping unit configured to convert at least part of the fish-eye image obtained by the fish-eye camera into a two-dimensional image using a dewarping parameter;
a conversion parameter calculation unit configured to calculate a conversion parameter for obtaining a bird's-eye view image from the two-dimensional image, showing an image from a hypothetical position looking down on the moving body;
a bird's-eye view image creation unit configured to create a bird's-eye view image by sequentially fetching position data corresponding to each pixel of the bird's-eye view image using the conversion parameter and the dewarping conversion parameter; and
a display device to display the bird's-eye view image created by the image creation unit.

2. The apparatus according to claim 1,
wherein the conversion parameter calculation unit comprises a specifying unit configured to selectively specify a plurality of pixels in the dewarped two-dimensional image.

3. The apparatus according to claim 1,
wherein a plurality of fish-eye camera are used and a plurality of conversion parameter calculation are provided, each corresponding to each fish-eye camera.

4. The apparatus according to claim 3, further comprising an image-synthesis unit configured to synthesize a plurality of bird's-eye view images obtained corresponding to respective fish-eye cameras into one image.

5. The apparatus according to claim 1, further comprising an image-recognition device configured to recognize an obstacle in the bird's-eye view image.

6. The apparatus according to claim 5,
wherein the image-recognition device recognizes an obstacle based a moving vector in the bird's-eye view image.

7. A surveillance apparatus, comprising:
a plurality of fish-eye cameras mounted on a vehicle imaging fish-eye images around the vehicle;
a dewarping unit configured to dewarp at least parts of the fish-eye images into two-dimensional images using dewarping parameters;
a conversion parameter calculation unit configured to calculate conversion parameters for converting the two-dimensional images into bird's-eye view images, each viewing from a hypothetical position looking down on the vehicle;
a bird's-eye view image generating unit configured to generate bird's-eye view images by sequentially calculating position data of a pixel in the fish-eye image corresponding to each pixel of the bird's-eye view image using the conversion parameter obtained by the conversion parameter calculation unit and the dewarping parameter;
an image superposing unit configured to superpose the bird's-eye view images into an superposed image; and
a display device to display the superposed image generated by the image superposing unit.

8. The apparatus according to claim 7,
wherein the bird's-eye view image generating unit uses a GPU function of a graphics processor unit.

9. A method of displaying a bird's-eye view image, comprising steps of:
storing a fish-eye image into a first memory showing surroundings of a movable body obtained using a fish-eye camera attached to the movable body;
performing calibration processing on part of the fish-eye image in advance and obtaining a group of image-conversion parameters to be used for converting the fish-eye image into a bird's-eye view image for overlooking the movable body to store the parameters into a second memory; and
sequentially calculating an image-data position of the fish-eye image corresponding to each pixel data of the bird's- eye view image using the group of image-conversion parameters of the second memory and sequentially fetching the image data from the first memory as pixel data of the bird's-eye view image to supply to a display device.

10. The method according to claim 9,
wherein the performing step comprises:
a converting step for converting part of the first fish-eye image into a dewarped two-dimensional image using a dewarping parameters; and
a calculating step for calculating conversion parameters which is used to convert the dewarped two-dimensional image into the bird's-eye view image,
wherein the dewarping parameter and the conversion parameters are used as the group of image-conversion parameters.

11. A method of converting an image for converting a fish-eye image obtained by a fish-eye camera mounted on a moving body into a bird's-eye view image viewed from a hypothetically overlooking position of the moving body, comprising:
obtaining a dewarping parameter for converting the fish-eye image into a dewarped image and a conversion parameter for converting the dewarped image into the bird's-eye view, thereby storing parameters into a parameter file; and
calculating a pixel position in the fish-eye image corresponding to each pixel in the bird's-eye view image using the dewarping parameter and the conversion parameter stored in the parameter file and sequentially fetching the pixel data of the fish-eye image and output as pixel data of the bird's-eye view image.

12. The method according-to claim 11,
wherein the images are moving images.

\* \* \* \* \*